(12) United States Patent
Zhu et al.

(10) Patent No.: US 7,621,588 B2
(45) Date of Patent: Nov. 24, 2009

(54) DEPLOYABLE DEFLECTOR FOR OUTSIDE MIRROR

(75) Inventors: Xijia Zhu, Windsor (CA); Mark E Gleason, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 725 days.

(21) Appl. No.: 11/329,709

(22) Filed: Jan. 10, 2006

(65) Prior Publication Data

US 2007/0159120 A1 Jul. 12, 2007

(51) Int. Cl.
*B60J 1/20* (2006.01)
(52) U.S. Cl. .................... 296/180.1; 296/152
(58) Field of Classification Search ............ 318/62, 318/280, 434, 445, 490; 296/180.1, 152, 296/91, 146.16; 359/507, 509, 838, 843, 359/844, 872, 877; 248/476, 487
See application file for complete search history.

(56) References Cited

U.S. PATENT DOCUMENTS

| | | | |
|---|---|---|---|
| 4,347,781 A | 9/1982 | Hassell | |
| 4,538,851 A * | 9/1985 | Taylor | 296/180.1 |
| 4,840,475 A * | 6/1989 | Herzog et al. | 359/841 |
| 5,069,538 A | 12/1991 | Shust et al. | |
| 5,114,205 A | 5/1992 | Jee | |
| 5,150,941 A | 9/1992 | Silzer et al. | |
| 5,179,470 A | 1/1993 | Olson | |
| 5,251,953 A | 10/1993 | Willey | |
| 5,315,442 A * | 5/1994 | Sato et al. | 359/877 |
| 5,431,477 A | 7/1995 | Smith et al. | |
| 5,797,645 A | 8/1998 | Schenk et al. | |
| 6,109,755 A * | 8/2000 | Duroux et al. | 359/841 |
| 6,322,221 B1 * | 11/2001 | van de Loo | 359/841 |
| 6,367,536 B1 | 4/2002 | St. Louis | |
| 6,419,300 B1 | 7/2002 | Pavao et al. | |
| 6,595,576 B2 | 7/2003 | Mizutani et al. | |
| 6,712,413 B1 | 3/2004 | Flowerday | |
| 6,863,407 B1 * | 3/2005 | Olijnyk et al. | 359/841 |
| 6,900,605 B2 * | 5/2005 | Nakaho | 318/280 |
| 6,910,909 B2 * | 6/2005 | Matsuura | 439/342 |
| 7,070,288 B2 * | 7/2006 | Mizutani et al. | 359/841 |
| 7,367,609 B2 * | 5/2008 | Grudzinski et al. | 296/180.1 |
| 7,477,137 B2 * | 1/2009 | Matsumoto et al. | 340/436 |
| 2005/0105199 A1 * | 5/2005 | Olijnyk et al. | 359/879 |
| 2006/0176591 A1 * | 8/2006 | Peterson | 359/877 |
| 2007/0138830 A1 * | 6/2007 | Isaac | 296/146.16 |
| 2007/0221812 A1 * | 9/2007 | Duroux et al. | 248/476 |
| 2008/0024891 A1 * | 1/2008 | Ruse et al. | 359/841 |

* cited by examiner

*Primary Examiner*—Walter Benson
*Assistant Examiner*—Eduardo Colon-Santana
(74) *Attorney, Agent, or Firm*—Ralph E. Smith

(57) ABSTRACT

An exterior mirror system for a motor vehicle includes a housing and a coupling arm. The coupling arm is adapted to couple the housing to a body of the motor vehicle. The exterior mirror system also includes a deployable panel substantially resident in the housing in a stowed position and extending toward the body in a deployed position.

9 Claims, 7 Drawing Sheets

DEPLOYABLE DEFLECTOR FOR OUTSIDE MIRROR

FIELD OF THE INVENTION

The present invention relates to wind noise reduction for motor vehicles.

BACKGROUND OF THE INVENTION

Generally, motor vehicles employ outside mirrors to enable operators to view hazards along side and behind their vehicles. Typically, these side mirrors extend away from the exterior of the motor vehicle and are developed to minimize the undesirable aerodynamic drag of the motor vehicle. This development to reduce aerodynamic drag typically results in increasing the strength of the airflow over the side windows of the vehicle. Through the Helmholz resonance phenomenon, this strong airflow can cause a buffeting pressure pulsation in the motor vehicle interior when the rear windows of the vehicle are opened. The wind buffeting phenomenon makes it undesirable for operators to have the rear windows open during operation of the motor vehicle at certain speeds.

SUMMARY OF THE INVENTION

An exterior mirror system for a motor vehicle according to a first aspect of the present invention is provided, including a housing and a coupling arm. The coupling arm is adapted to couple the housing to a body of the motor vehicle. The exterior mirror system also includes a deployable panel substantially resident in the housing in a stowed position and extending toward the body in a deployed position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
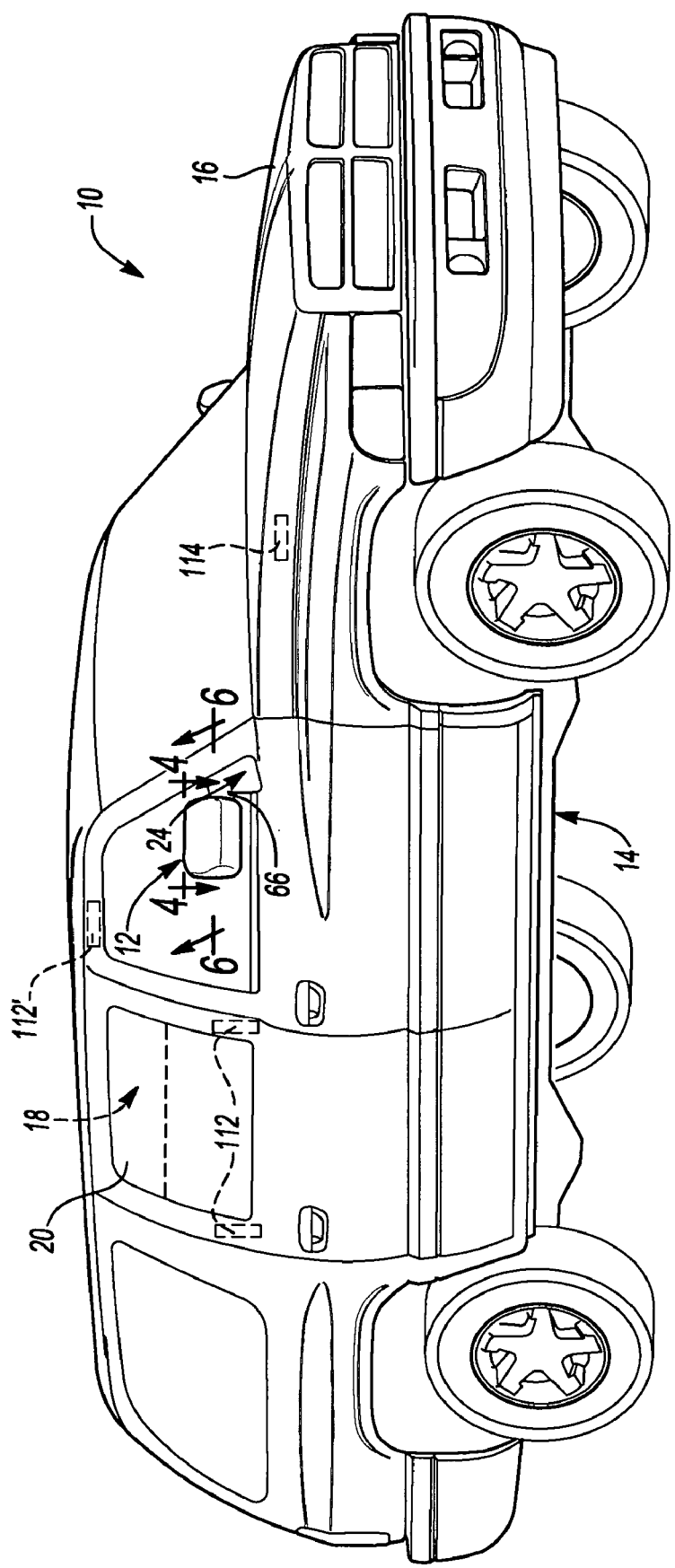
FIG. 1 is a perspective view of an exemplary motor vehicle including a deployable deflector for an outside mirror according to an exemplary embodiment of the present invention.
Figure 6:
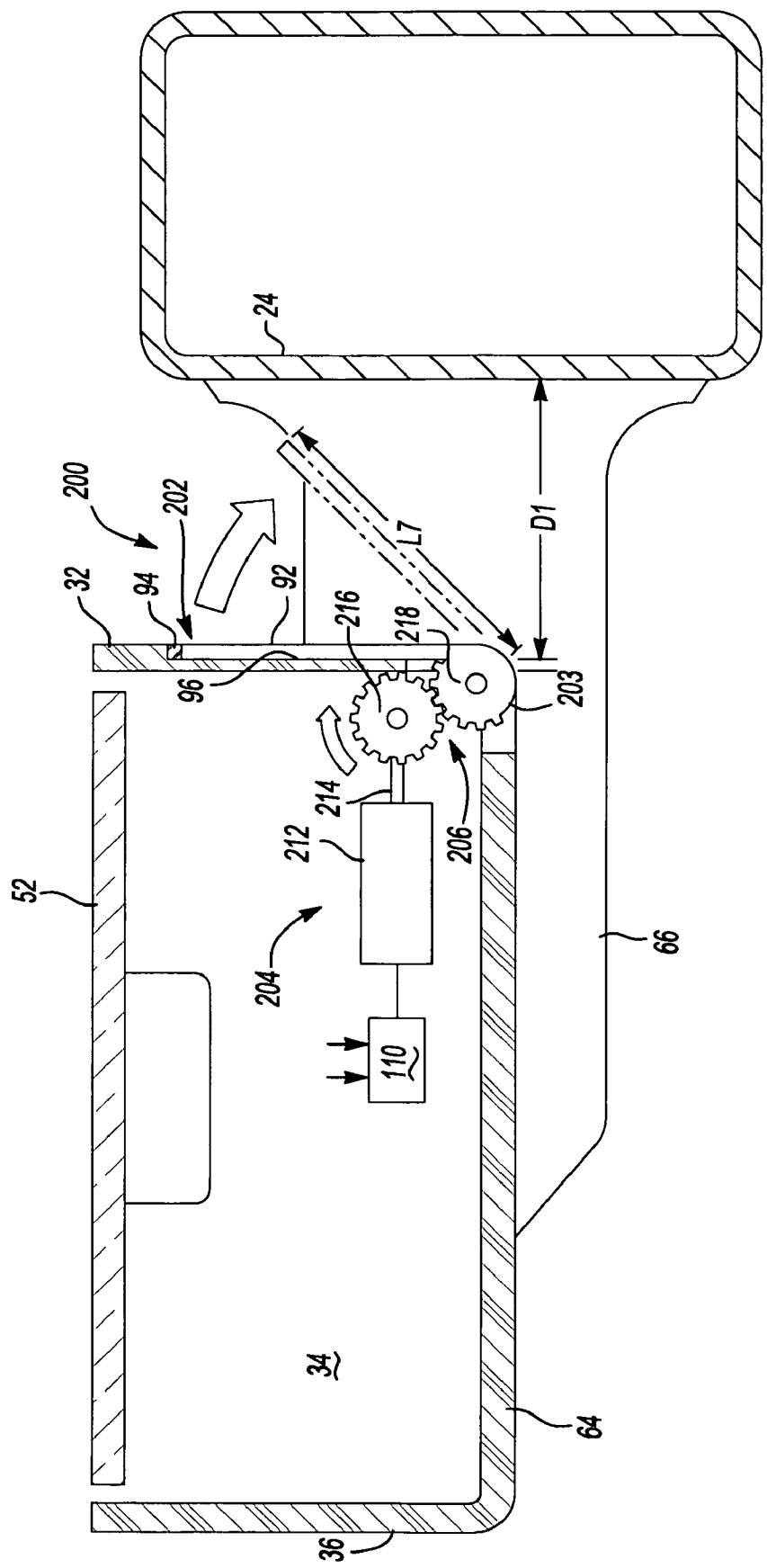
Figure 7:
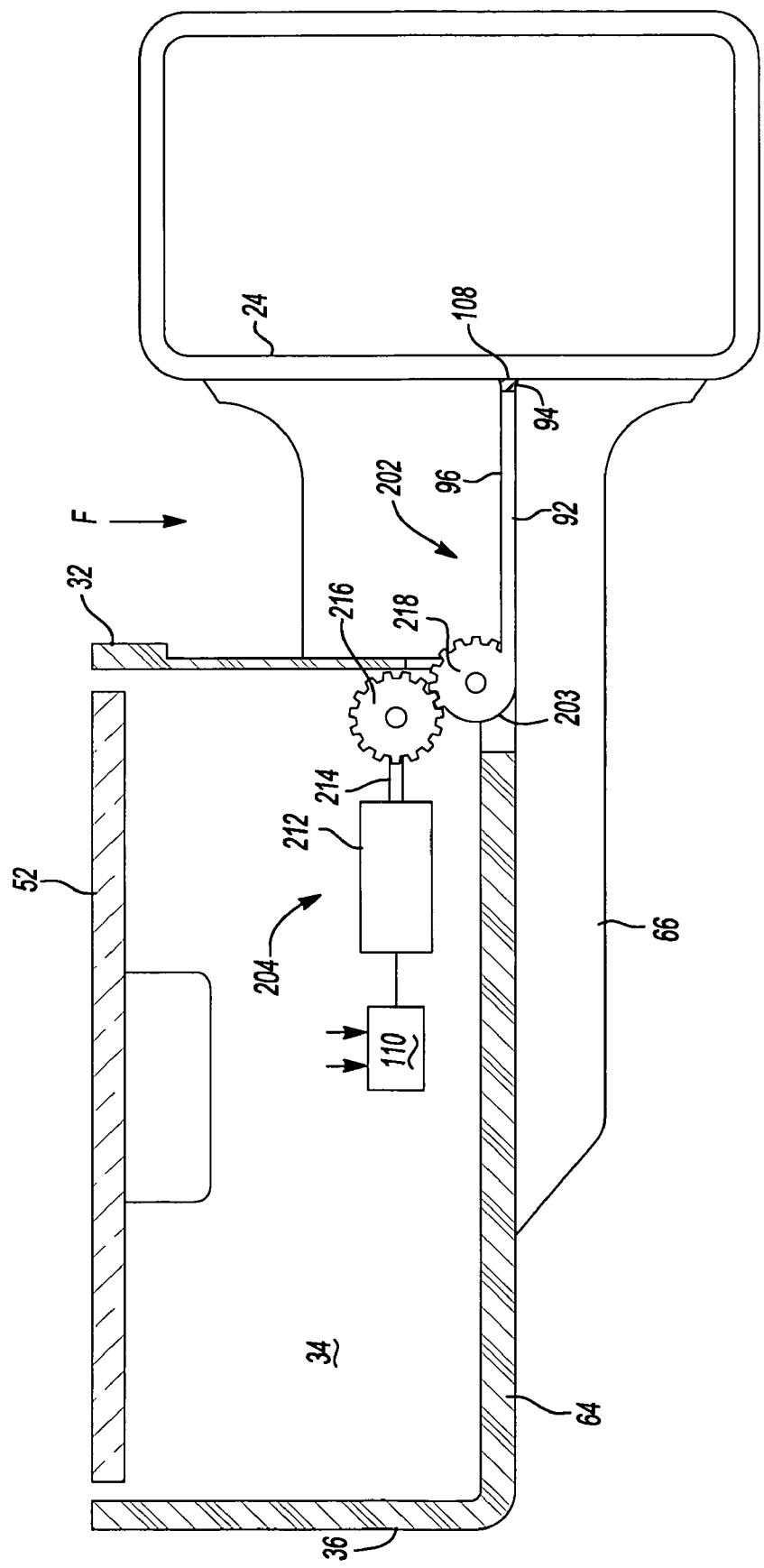

FIG. 6 is a cross-sectional view of the outside mirror of FIG. 1, taken along line 6-6 of FIG. 1, employing an alternative deployable deflector in a partially deployed position according to an exemplary embodiment of the present invention; and FIG. 7 is a detailed perspective view of the alternative deployable deflector of FIG. 6 in the deployed position according to an exemplary embodiment of the present invention.

DETAILED DESCRIPTION

The following description is merely exemplary in nature and is not intended to limit the present disclosure, application, or uses. Although the following description is related generally to an outside mirror deploying a deflector for side window buffeting reduction for a mobile platform, such as a motor vehicle, it will be understood that the outside mirror, as described and claimed herein, is used with any appropriate application. Therefore, it will be understood that the following discussions are not intended to limit the scope of the appended claims.

Figure 2:
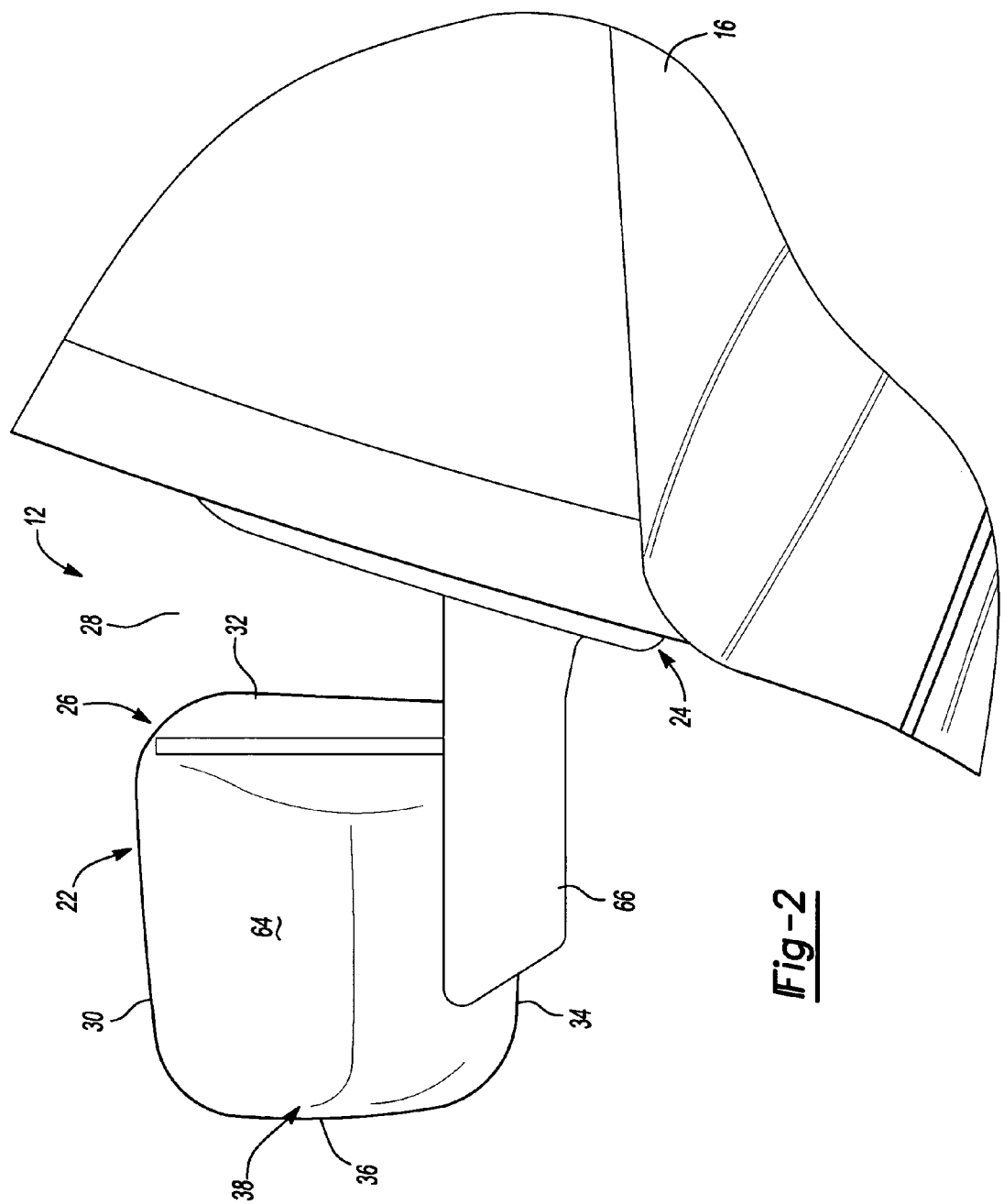
FIG. 2 is a detailed perspective view of the outside mirror of FIG. 1 with the deployable deflector shown in non-deployed position according to an exemplary embodiment of the present invention.
Figure 3:
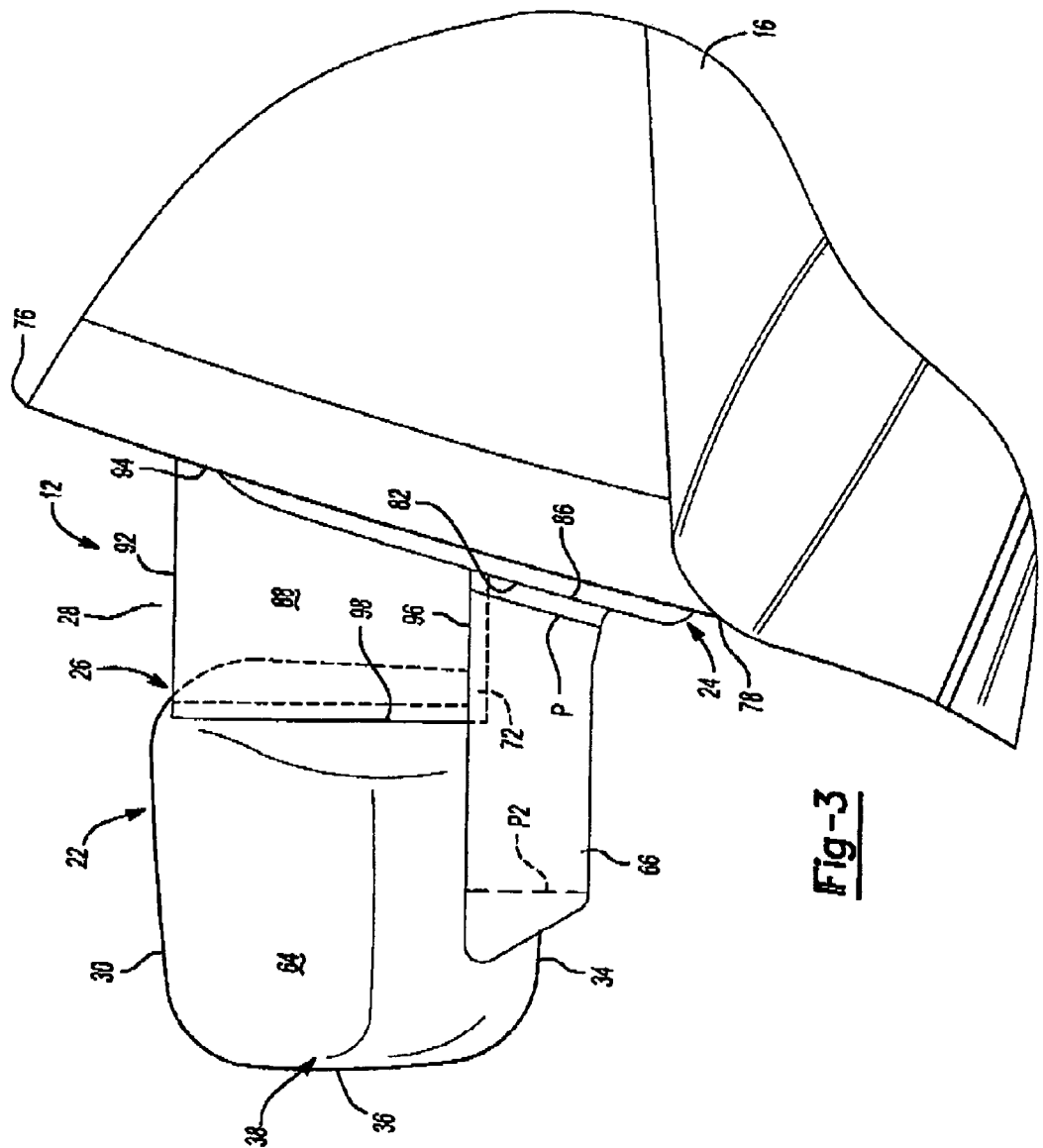
FIG. 3 is a detailed perspective view of the outside mirror of FIG. 1 with the deployable deflector shown in deployed position according to an exemplary embodiment of the present invention.

With reference now to FIGS. 1, 2 and 3, a motor vehicle 10 is shown with an outside mirror 12. The outside mirror 12 is generally mounted to an exterior 14 of the motor vehicle 10 adjacent to a front end 16 of the motor vehicle 10. It will be understood that although the outside mirror 12 is described herein as being mounted near a front end 16 of the motor vehicle 10, the outside mirror 12 is mounted at any desired location on the motor vehicle 10 that lies upstream of the airflow over the sideglass surfaces of the motor vehicle. The motor vehicle 10 defines a passenger area 18, which includes at least one or a plurality of rear windows 20. The outside mirror 12 generally includes a projecting portion or a mirror housing 22 coupled to an attachment portion or support 24 with a deflector system 28 coupled to at least one of the mirror housing 22 and the support 24, as will be described herein. The deflector system 28 moves from a stowed or non-deployed position (FIG. 2) to a fully deployed position (FIG. 3) to substantially fill a channel 26 defined between the mirror housing 22 and the support 24. The deflector system 28 generally serves to reduce a buffeting effect that occurs when at least one of the rear windows 20 is moved from a closed position to an open position (shown in phantom).

With additional reference to FIG. 6, the mirror housing 22 is generally square or rectangular with a projecting portion defining a first side 30, a second side 32, a third side 34 and a fourth side 36 coupled to a mounting plate 38. Typically, the first side 30, the second side 32, the third side 34, and the fourth side 36 are each coupled to the mounting plate 38 to define a cavity for receipt of a mirror 52, as best shown in FIG. 6. The mirror 52 will not be described in great detail herein; however, the mirror 52 is configured to pivot with respect to the cavity as is generally known. With reference back to FIGS. 2 and 3, the first side 30 is generally parallel to the third side 34 and the second side 32 is generally parallel to the fourth side 36 (FIG. 2). The mirror housing 22 is composed of a polymeric material, such as polyester thermoplastic, and is integrally formed through molding.

Figure 5:
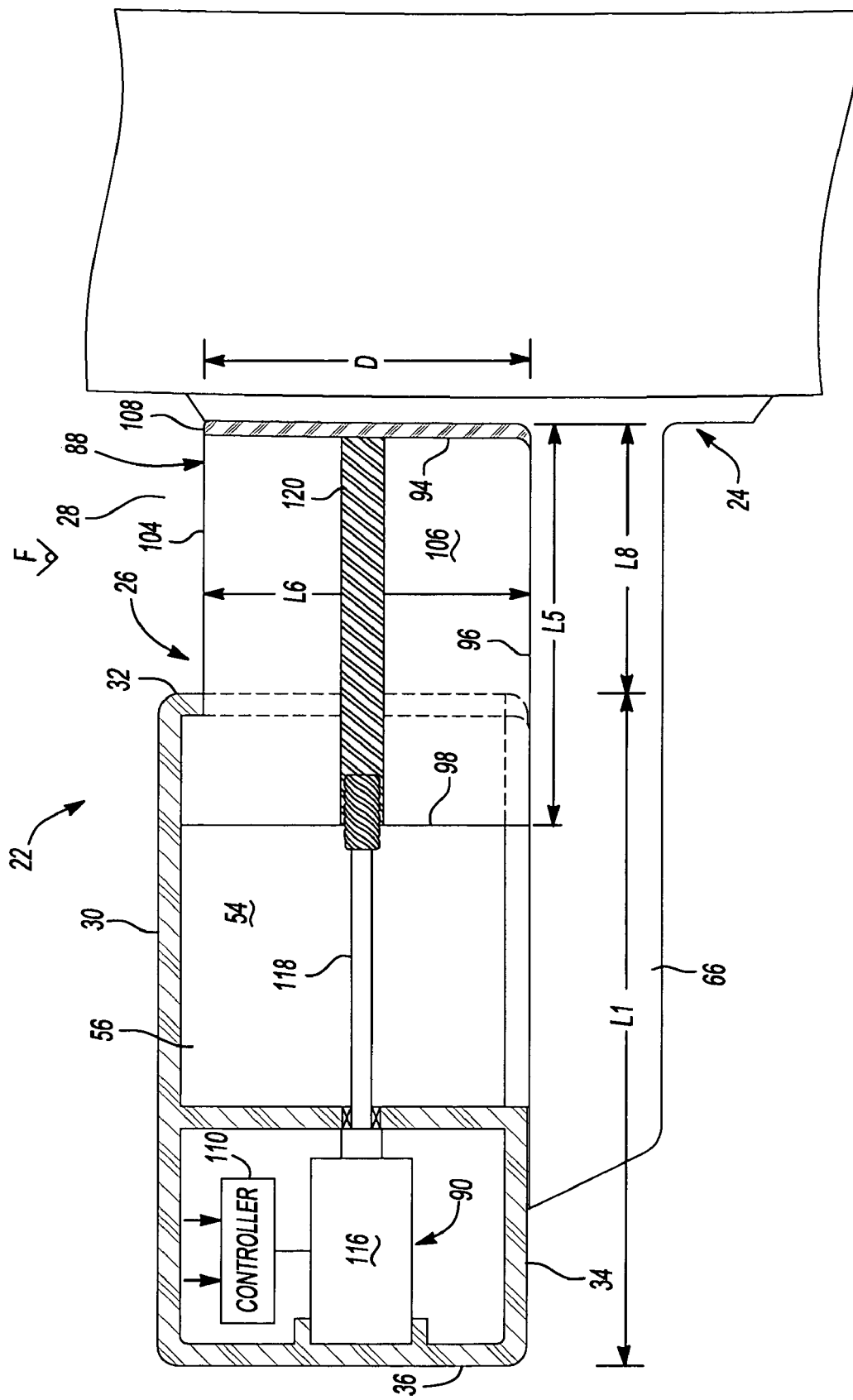
FIG. 5 is a cross-sectional view of the outside mirror of FIG. 1, taken along line 4-4 of FIG. 1, with the deflector in the deployed position according to an exemplary embodiment of the present invention.

With additional reference to FIGS. 5 and 6, the mounting plate 38 generally has a first side 54 and a second side 64. A chamber 56 is defined in between a rear side 62 of the mirror 52 and the first side 54 of the mounting plate 38. The chamber 56 receives at least a portion of the deflector system 28 as will be described in greater detail below. The second side 64 of the mounting plate 38 couples the mirror housing 22 to the support 24. Generally, the second side 64 of the mounting plate 38 includes an attachment portion or an arm 66, which mates with the support 24 to enable the mounting plate 38 and mirror housing 22 to pivot with respect to the support 24.

The arm 66 is configured to pivot about a pivot P (FIG. 3) allowing the mirror housing 22 and/or arm 66 to fold inboard to a position either fore or aft of its normally functioning position. It should be noted that the pivot P can be positioned at any desired location on the arm 66, such as pivot P2 (as shown in phantom in FIG. 3). The arm 66 also defines a slot 72 for receipt of at least a portion of the deflector system 28, as will be described in greater detail herein. The arm 66 pivotably engages the support 24.

The support 24 includes a first end 76 and a second end 78, as best shown in FIG. 3. The support 24 is composed of a polymeric material, such as polyester thermoplastic. The support 24 is generally coupled to the exterior 14 of the motor vehicle 10. The support 24 is coupled to the exterior 14 through any appropriate technique, such as mechanical fasteners, adhesives or bonding. The support 24 is any appropriate shape, but is typically triangular. The support 24 defines a surface 82, which pivotably and slideably engages a surface 86 of the arm 66 to enable the mirror housing 22 to pivot with respect to the second end 78.

With additional reference to FIG. 5, the deflector system 28 includes a flap 88 and a control system 90. The flap 88 is composed of a polymeric material, however, any material with suitable rigidity is employed. The flap 88 is generally operable in a retracted or stowed position (FIG. 2) and an extended or deployed position (FIG. 3). The flap 88 generally has a first side 92, a second side 94, a third side 96 and a fourth side 98. The first side 92 and third side 96 generally have a length L5, which is less than a length L1 of the mirror housing 22, but is greater than a length L8 if desired (FIG. 5). In addition, the first side 92 and third side 96 are configured to slideably engage at least one or a plurality of guides formed in the mirror housing 22 (not specifically shown). The flap 88 has a central length L6, which is at least equivalent to a distance D of the support 24, or is greater than the distance D if desired (FIG. 5). In addition, the second side 94 is coupled to or includes a seal 108 to seal the flap 88 against the support 24 when the flap 88 is in the deployed position. In addition, it will be understood that the second side 94 is generally configured to contact the support 24, and thus has any desired shape, such as angular.

A first surface 104 of the flap 88 is generally exposed to a drag force F when the flap 88 is in the deployed position and a second surface 106 of the flap 88 is coupled to the control system 90. The control system 90 includes a controller 110 configured to receive a signal from a first sensor 112 and a second sensor 114 to operate a motor 116. The first sensor 112 is a position sensor coupled to both of the rear windows 20 to sense the location of the rear window 20, and transmit the signal when the rear window 20 enters an open position (FIG. 1). In the alternative, the first sensor 112 is a pressure sensor 112' operable to transmit the signal when a pressure in the passenger area 18 exceeds a pre-selected value (FIG. 1). The second sensor 114 is a vehicle speed sensor that transmits a signal to the controller 110 when the vehicle speed exceeds a threshold (FIG. 1).

Figure 4:
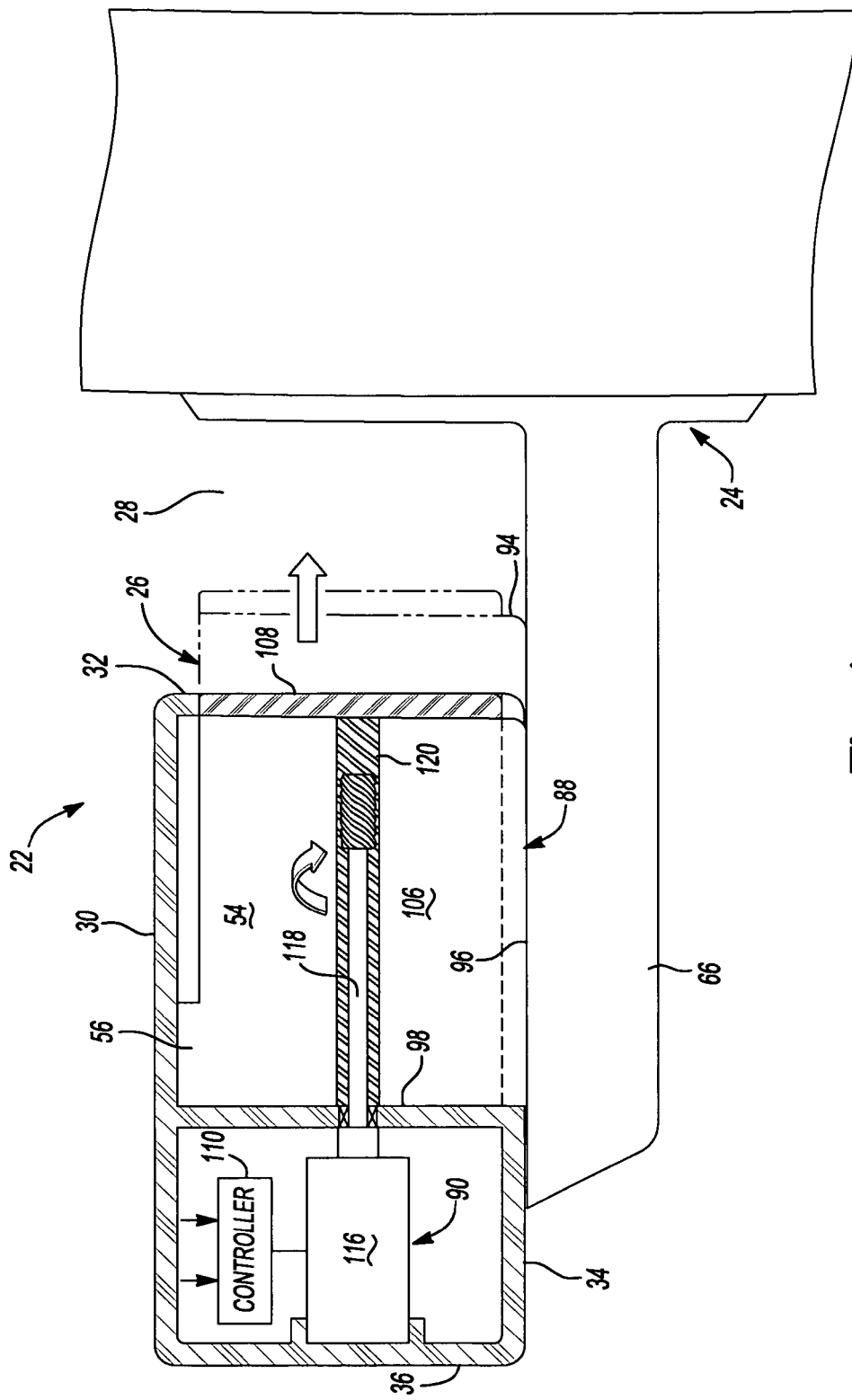
FIG. 4 is a cross-sectional view of the outside mirror of FIG. 1, taken along line 4-4 of FIG. 1, with the deflector advancing towards the deployed position according to an exemplary embodiment of the present invention.

With reference back to FIGS. 4 and 5, upon receipt of the signals from the first and second sensors 112, 112', 114, the controller 110 initiates the motor 116. The motor 116 is any suitable electric motor, such as a DC motor, and includes an output shaft 118. The output shaft 118 is a screw drive that engages a bore 120 coupled to the second side 106 of the flap 88. Thus, the rotation of the output shaft 118 translates the flap 88 into and out of the deployed position. It should be noted, however, that various other mechanisms may be employed to translate the flap 88 from the stowed position to the deployed position. When the speed of the motor vehicle 10 falls below the threshold and/or the rear window position is changed, the first sensor 112 or the second sensor 114 sends a second signal to the controller 110. Based on the second signal, the controller 110 drives the motor 116 in the reverse direction to move the flap 88 from the deployed position to the stowed position.

In the alternative, with reference now to FIGS. 6 and 7, an alternative deflector system 200 is shown. As the deflector system 200 is similar to the deflector system 28, the same reference numerals will be used for the same or similar components. The deflector system 200 includes the flap 202 and a control system 204. The flap 202 is generally operable in a retracted or stowed position and an extended or deployed position (as shown in phantom in FIG. 6). The first side 92 and third side 96 of the flap 202 generally have a length L7, which is at least equivalent to a distance D1. The second side 94 is coupled to and includes a seal 108 to seal the flap 202 against the support 24 when the flap 202 is in the deployed position. In addition, it will be understood that the second side 94 is generally configured to contact the support 24.

A fourth side 203 of the flap 202 defines a pivot point P at an intersection of the third side 96 and the fourth side 203. The pivot point P is defined by a geared hinge 206. The third side 96 is responsive to the control system 204 to enable the flap 202 to move from the stowed position (FIG. 6) to the deployed position (FIG. 7).

The control system 204 includes the controller 110 coupled to a motor 212. The motor 212 includes a drive shaft 214, which includes a worm (not shown) to rotate a first spur gear 216 coupled to a second spur gear 218 formed at the intersection of the third side 96 and the fourth side 203 to pivot the flap 202 from the stowed position to the deployed position upon receipt of the signals from the first and second sensors 112, 114. When the speed of the motor vehicle 10 falls below the threshold value, the controller 110, based on the second signal, actuates the motor 212 to rotate in a reversed direction to move the flap 202 from the deployed position to the stowed position. It will be understood, however, that any device may be used to pivot the flap 202 from the first position to the second position.

During the operation of the motor vehicle 10, if the speed of the motor vehicle 10 exceeds the threshold value, the second sensor 114 sends the signal to the controller 110. If, during the continued operation of the motor vehicle 10 at this speed, the rear windows 20 of the motor vehicle 10 are moved from the closed position to the open position, or the pressure in the passenger area 18 exceeds the pre-selected amount, the first sensor 112 sends the signal to the controller 110. Based on the signals from the first and second sensors 112, 114, the controller 110 activates the motor 116, 212 to move the flap 88, 202 from the stowed position to the deployed position. If the controller 110 actuated the motor 116, the motor 116 rotates the output shaft 118 to translate the flap 88 in the guides 102 from the first position to the second position to fill the channel 26 defined by the distance between the mirror housing 22 and the support 24. If the controller 110 actuates the motor 212, the geared hinge 206 pivots the flap 202 from the stowed position to the deployed position. If the speed of the motor vehicle 10 falls below the threshold, the second sensor 114 then sends the second signal to the controller 110 and the controller 110 actuates the motor 116, 212 to move the flap 88, 202 from the deployed position to the stowed position.

The description of these teachings is merely exemplary in nature and, thus, variations that do not depart from the gist of the teachings are intended to be within the scope of the teachings. Such variations are not to be regarded as a departure from the spirit and scope of the teachings.

What is claimed is:

1. An exterior mirror system for a motor vehicle comprising:
   a housing;
   a coupling arm adapted to couple the housing to a body of the motor vehicle;
   a deployable panel substantially resident in the housing in a stowed position and extending toward the body in a deployed position;
   at least one pressure sensor disposed within the motor vehicle, the at least one pressure sensor adapted to be responsive to a pressure in the motor vehicle to generate an input signal;
   a controller responsive to the input signal to generate a drive signal; and
   a motor configured to deploy the deployable panel upon receipt of the drive signal.

2. The exterior mirror system of claim 1, wherein the deployable panel includes at least one seal.

3. The exterior mirror system of claim 1, further comprising:
   a first gear coupled to the motor; and
   a second gear coupled to the first gear and at least a portion of the deployable panel,
   wherein the rotation of the first gear by the motor can rotate the second gear to deploy the deployable panel upon receipt of a drive signal.

4. The exterior mirror system of claim 1, further comprising:
   a slot formed in a side portion of the housing for receipt of the deployable panel, the slot configured to enable the deployable panel to extend laterally toward the body.

5. A motor vehicle comprising:
   a body defining a passenger area;
   a mirror housing defining a cavity and an arm coupled to the cavity;
   a support having a first end coupled to the body and a second end projecting from the first end, the second end pivotably coupled to the arm;
   a channel defined between the mirror housing and the body, at least one of the second end of the support and the arm defining a base for the cavity;
   a deployable panel resident in the mirror housing in a stowed position and extending toward the body in a deployed position to substantially fill the channel;
   a pressure sensor disposed within the motor vehicle, the pressure sensor responsive to a pressure in the motor vehicle to generate an input signal;
   a controller responsive to the input signal to generate a drive signal; and
   a motor configured to deploy the deployable panel upon receipt of the drive signal.

6. The motor vehicle of claim 5, further comprising:
   a first gear coupled to the motor; and
   a second gear coupled to the first gear and at least a portion of the deployable panel,
   wherein the rotation of the first gear by the motor can rotate the second gear to deploy the deployable panel upon receipt of a drive signal.

7. The motor vehicle of claim 5, further comprising:
   a slot formed in a side portion of the mirror housing for receipt of the deployable panel, the slot configured to enable the deployable panel to extend laterally to substantially fill the cavity.

8. An exterior mirror system for a motor vehicle, the motor vehicle including at least one rear window moveable between a closed position and an open position, comprising:
   a mirror housing defining a cavity and an arm coupled to the cavity;
   a support having a first end coupled to the motor vehicle and a second end projecting from the first end, the second end pivotably coupled to the arm;
   a channel defined between the mirror housing and a body of the motor vehicle;
   a deployable panel resident in the housing in a stowed position and extending toward the body of the motor vehicle in a deployed position;
   a first sensor responsive to the at least one rear window in the open position to generate a first input signal;
   a second sensor responsive to a speed of the motor vehicle to generate a second input signal when the speed of the motor vehicle exceeds a threshold; and
   a controller responsive to at least one of the first input signal and the second input signal to extend the deployable panel to fill the channel.

9. The exterior mirror system of claim 8, further comprising:
   a slot formed in a portion of the arm for receipt of the member, the slot configured to enable the deployable panel to extend laterally toward the body; and
   a motor configured to deploy the deployable panel through the slot upon receipt of a drive signal from the controller.

* * * * *